US012144322B2

(12) United States Patent
Chan

(10) Patent No.: US 12,144,322 B2
(45) Date of Patent: Nov. 19, 2024

(54) INTERACTIVE SYSTEM FOR PETS

(71) Applicant: Zoo Gears Limited, Hong Kong (HK)

(72) Inventor: Tak Keung Chan, Hong Kong (HK)

(73) Assignee: Zoo Gears Limited, Hong Kong (HK)

( * ) Notice: Subject to any disclaimer, the term of this patent is extended or adjusted under 35 U.S.C. 154(b) by 176 days.

(21) Appl. No.: 17/885,561

(22) Filed: Aug. 11, 2022

(65) Prior Publication Data

US 2023/0049347 A1 Feb. 16, 2023

Related U.S. Application Data

(60) Provisional application No. 63/232,166, filed on Aug. 12, 2021.

(51) Int. Cl.
*A01K 15/02* (2006.01)
*A01K 29/00* (2006.01)

(52) U.S. Cl.
CPC ............ *A01K 15/021* (2013.01); *A01K 29/00* (2013.01)

(58) Field of Classification Search
CPC ...... A01K 15/021; A01K 5/02; A01K 5/0114; A01K 5/0233; A01K 5/0258; A01K 5/0275; A01K 5/0291
See application file for complete search history.

(56) References Cited

U.S. PATENT DOCUMENTS

| | | | | |
|---|---|---|---|---|
| 6,487,992 | B1 * | 12/2002 | Hollis | A01K 15/022 119/712 |
| 9,737,049 | B2 * | 8/2017 | Trottier | A01K 5/0291 |
| 11,445,704 | B1 * | 9/2022 | Trottier | A01K 15/021 |
| 2005/0224003 | A1 * | 10/2005 | Yin | A01K 5/0275 119/61.5 |
| 2008/0000345 | A1 | 1/2008 | Hasegawa et al. | |
| 2009/0051548 | A1 * | 2/2009 | Dundon | A01K 1/035 340/573.3 |
| 2012/0312247 | A1 * | 12/2012 | Ebersole | A01K 15/02 340/573.3 |
| 2016/0302383 | A1 * | 10/2016 | Frieden | A01K 5/02 |
| 2017/0196196 | A1 * | 7/2017 | Trottier | A01K 15/027 |
| 2018/0132453 | A1 * | 5/2018 | Foster | A01K 15/021 |
| 2019/0357497 | A1 * | 11/2019 | Honchariw | A01K 15/021 |

(Continued)

FOREIGN PATENT DOCUMENTS

| | | |
|---|---|---|
| CN | 106462924 A | 2/2017 |
| CN | 107378945 A | 11/2017 |

(Continued)

*Primary Examiner* — Joshua J Michener
*Assistant Examiner* — Nicole Paige MacCrate
(74) *Attorney, Agent, or Firm* — Idea Intellectual Limited; Margaret A. Burke; Sam T. Yip

(57) ABSTRACT

An interactive system for pets comprising:
a pet interaction device arranged to engage and capture an actuating motion of a pet, the pet interaction device comprising: one or more actuators for actuation by the pet, the one or more actuators configured to produce a stimulus for the pet or owner, a computing apparatus comprising a processing unit and a memory unit, wherein the processing unit is in communication with the one or more actuators and configured to stimulate or receive the actuating motion of the pet, and wherein the processing unit is further arranged to process the captured actuating motion and communicate the captured actuating motion to the owner.

18 Claims, 10 Drawing Sheets

(56) References Cited

U.S. PATENT DOCUMENTS

2022/0312725 A1* 10/2022 Deraps ................. A01K 5/0114
2022/0378017 A1* 12/2022 Ye ....................... G06F 3/04847

FOREIGN PATENT DOCUMENTS

| CN | 109064014 A | 12/2018 |
| CN | 112704023 A | 4/2021 |
| TW | 201033909 A1 | 9/2010 |

\* cited by examiner

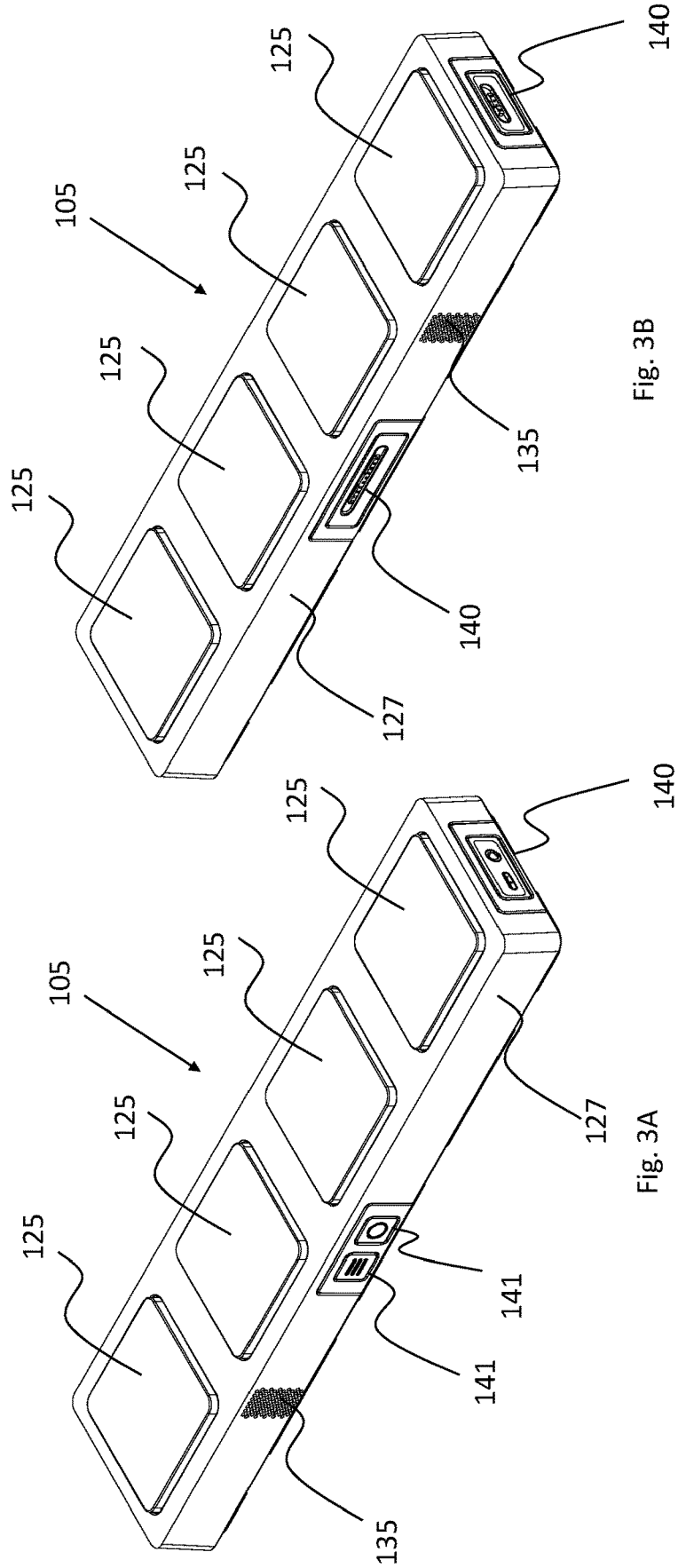

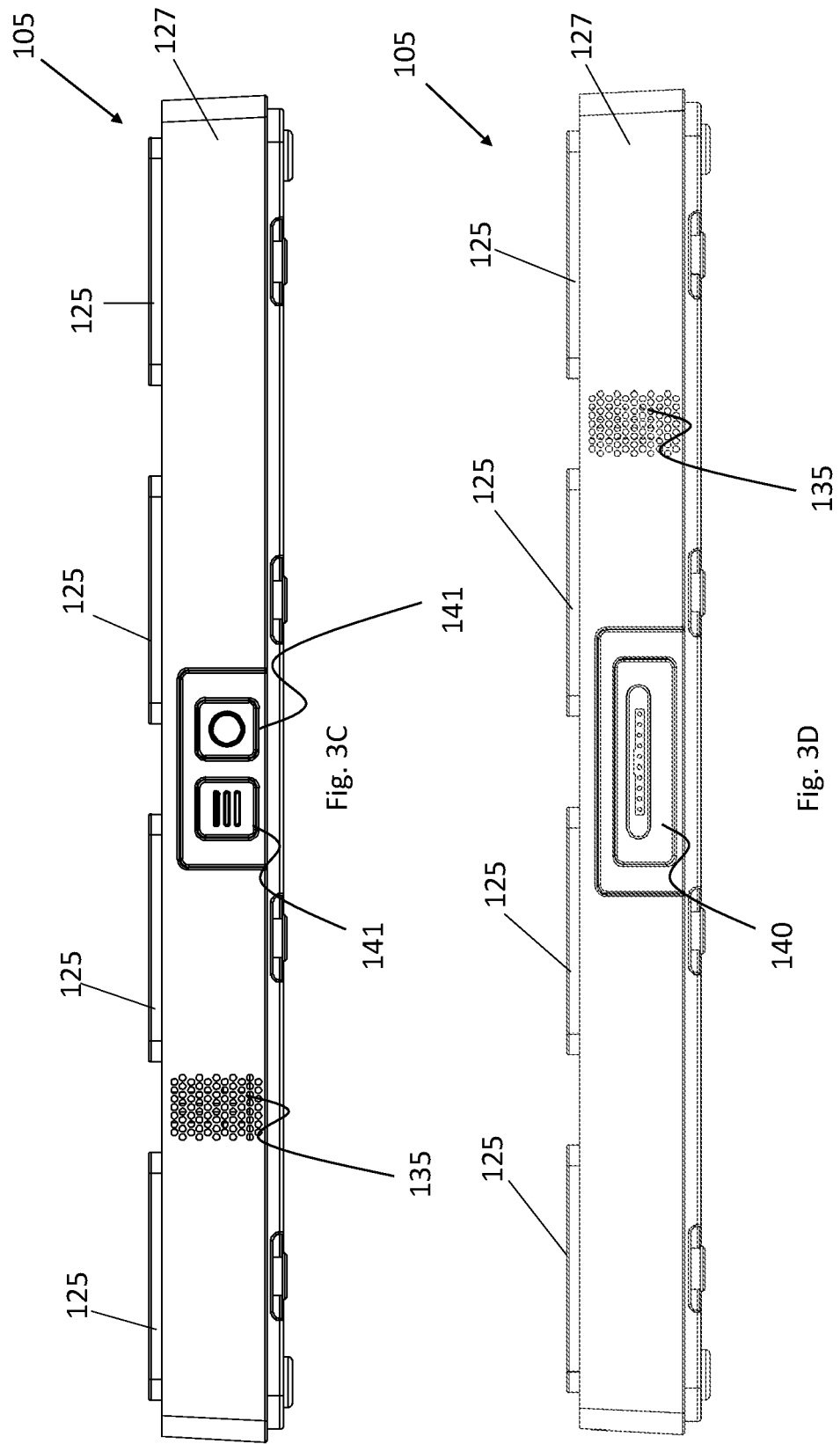

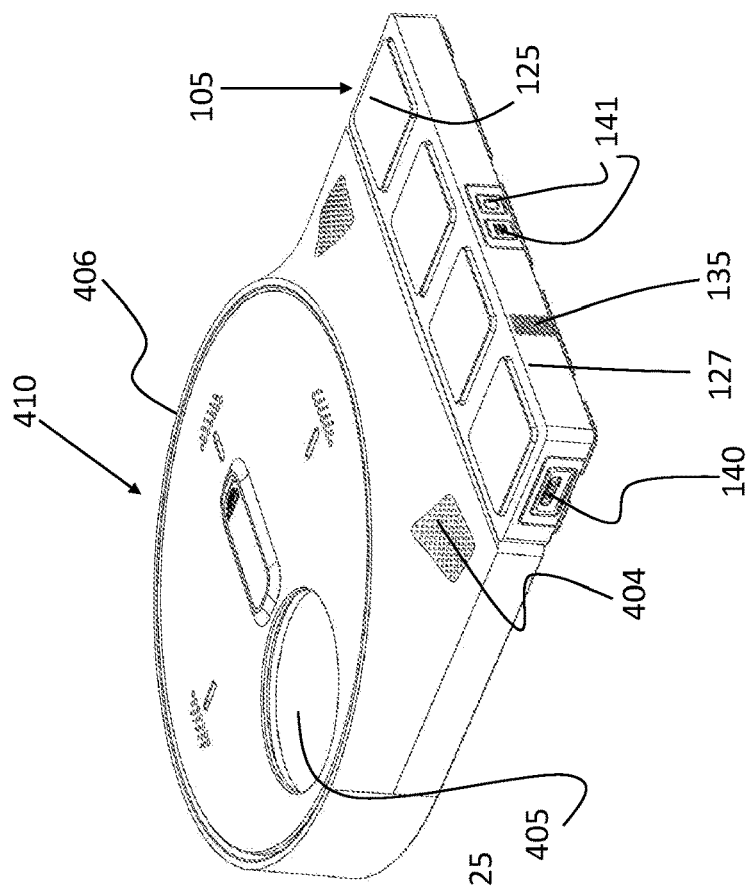
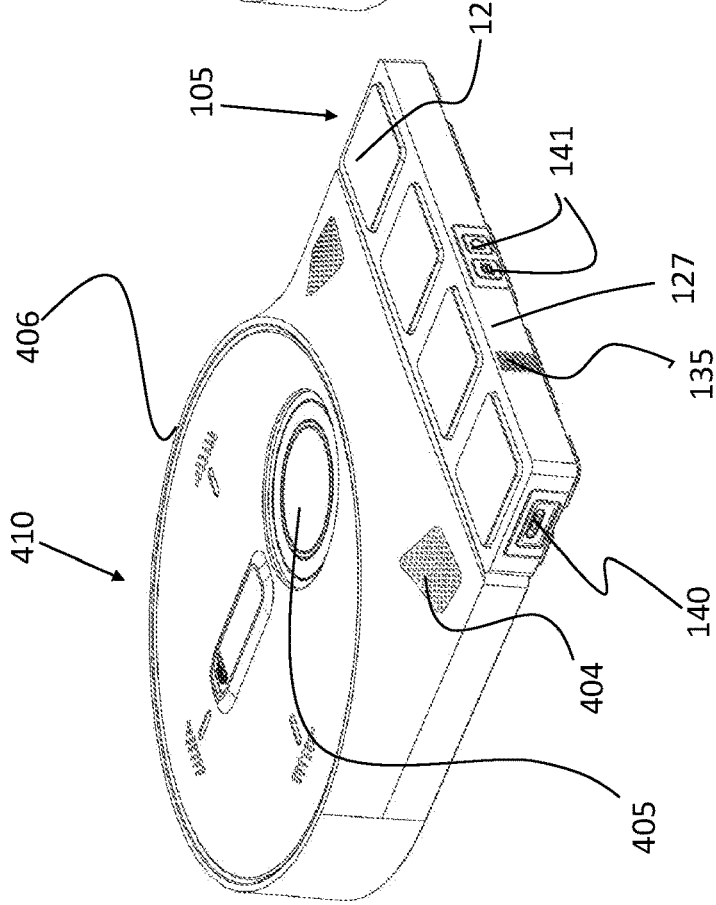
Fig. 6A
Fig. 6B

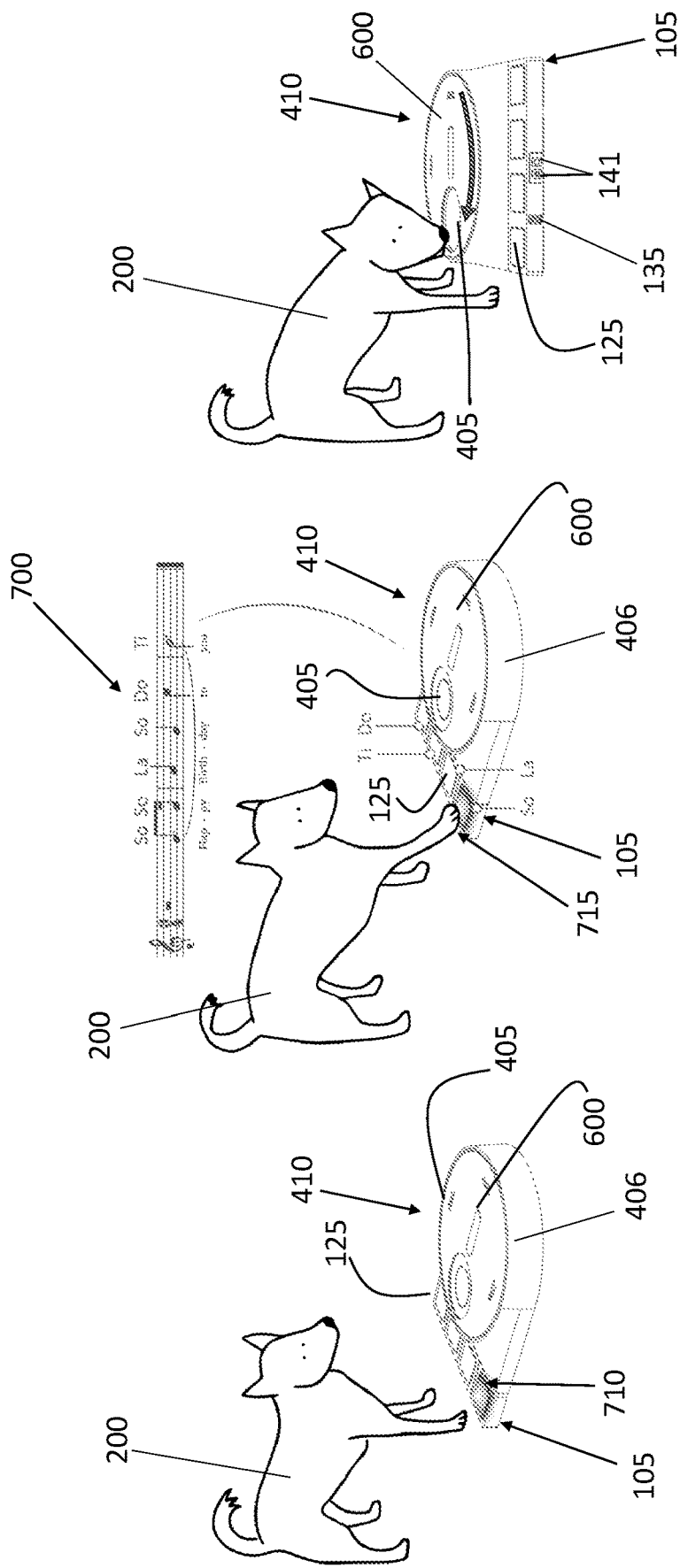

INTERACTIVE SYSTEM FOR PETS

TECHNICAL FIELD

This invention relates to an interactive system for pets, and particularly, although not exclusively, to an interactive system arranged to engage and capture the actuating motion of a pet or animal.

BACKGROUND

The number of households that have one or more pets has been steadily increasing in recent years. Today's hectic lifestyle means people are working harder and longer hours, sometimes spending long periods away from family and friends.

Pets are therefore becoming more popular and commonplace as they offer companionship and comfort to their owners. Due to their loving nature, pets often carve themselves a special place in every family's heart and are commonly considered and treated as family members. Although the most common pets are typically cats and dogs, other domestic animals such as hamsters, guinea pigs or rabbits may also be found in some households.

Most owners care for the health and wellbeing of their pets and are willing to invest in their physical and emotional health. A pet's physical, emotional and psychological wellbeing is typically better if they have frequent and meaningful interactions with their owner. Owners are also often interested in training their pets to behave in a certain way. As a result, more owners are training and engaging with their pets and monitoring their physical and emotional health by visual assessment or by regular visits to the veterinary doctor. However, these methods of monitoring can be unreliable or expensive. Simple and user-friendly ways of monitoring interaction with a pet are desired.

SUMMARY OF THE INVENTION

In accordance with a first aspect of the invention, there is provided an interactive system for pets including a pet interaction device arranged to engage and capture an actuating motion of a pet, the pet interaction device including: one or more actuators for actuation by the pet, the one or more actuators configured to produce a stimulus for the pet or owner, a computing apparatus including a processing unit and a memory unit, wherein the processing unit is in communication with the one or more actuators and configured to stimulate or receive the actuating motion of the pet, and wherein the processing unit is further arranged to process the captured actuating motion and communicate the captured actuating motion to the owner.

In some embodiments, the pet interactive system of the invention further includes a remote display having a display configured to wirelessly communicate with the pet interaction device and/or one or more peripheral devices connected to the pet interaction device, the remote computer arranged to receive data related to the pet from the pet interaction device and/or one or more peripheral devices in a suitable communication format for presenting on the display to the owner. Most preferably, the remote computer is configured to enable the owner to select the stimulus for the pet.

The pet interactive system may advantageously provide a simple and effective means for an owner to interact or play with, train or modify the behaviour of their pet. The interactive system is user-friendly and portable and allows a pet owner to customise the interactive system to their requirements or their pet's preference. Pets owners can tailor the interactive system to output their preferred stimuli, i.e., pre-recorded voice commands, music or even coloured lights, to their pets by simply selecting the stimuli from a remote computer such as a smartphone or tablet. Therefore, the interactive system allows for long-term use as the owner can adapt the system to suit the changing needs, behaviour of their pet, or according to the stages of their pet's training programme. In an example embodiment, the pet is a domestic animal such as a cat or dog. Most preferably, the pet is a dog.

In a preferred embodiment, the stimulus includes sounds. These sounds may be pre-recorded, such as voice commands, words or sentences pre-recorded by the owner, or music. In an example embodiment, actuation of each actuator produces a different sound, for example the musical sounds "do", "re" and "mi". The pet owner can tailor the pet interaction device such that they can assign different sounds to each actuator through a remote computer.

In an alternative embodiment, the stimulus includes light. For example, the light includes different coloured lights, flashing, blinking, or dimming light. The stimulus, in yet another embodiment, includes a combination of light and sound.

Preferably, the pet interaction device includes one or more sensors electrically connected to the processing unit, the one or more sensors configured to detect the actuating motion and transmit sensor signals corresponding to the actuating motion to the processing unit. The sensors beneficially allow the owner to capture and view the actuating motion of the pet in response to various stimuli and track their pet's engagement.

In a most preferred embodiment, the pet interaction device has an elongate body and the one or more actuators are palm-sized buttons adapted to receive a paw of the pet. The elongate body of the pet interaction device advantageously allows for easy access by the pet and the palm-sized buttons are shaped to accommodate the size and dexterity of a pet's paw, which is significantly different to that of a human hand. Most preferably, the pet interaction device is a keyboard, and the one or more actuators are keys or buttons on the keyboard, and the actuating motion is the pet depressing the keys/buttons on the keyboard with their paw.

An advantageous feature of the pet interaction device is its modular capability. In a preferred example embodiment, the pet interaction device is modular and adapted to connect to one or more peripheral devices. This boosts the versatility of the interactive system and allows for the inclusion of additional elements that will increase or further develop a pet's interaction, such as toys or the promise of a reward like a treat. For example, the peripheral devices include one or more of a food dispenser, treat dispenser, water dispenser, location tracking device, fitness tracking device, button module(s), speakers, video cameras, power source, amplifier, training toy, animatronics trainer, battery, pet door, pet bed, pet-monitoring pet house, pet toilet or carpet. The pet interaction device can connect to the one or more peripheral devices wirelessly or via one or more connection ports.

In one embodiment, the peripheral device the pet interaction device can connect to is a dispensing device that is configured to release food to the pet in response to the captured actuating motion. The dispensing device is, for example, a food or treat dispenser.

Preferably, the dispensing device is arranged to release food via a turntable release mechanism, the turntable release mechanism including a rotatable turntable, motor, worm gear, gear with magnet and a circuit board with sensor.

The modularity of the pet interaction device with a peripheral device such as a dispensing device allows the owner to create a reward system where the pet can be rewarded with a treat after engaging with the pet interaction device or responding correctly to the selected stimulus.

In another example embodiment, the one or more peripheral devices is a monitoring or tracking device configured to monitor a location or heart rate of the pet, for example a collar or harness adapted to be removably mountable on the pt. This advantageously enables the owner to monitor the pet's location or heart rate at various stages of training or interacting with their pet and assess their physical wellbeing and movements at different times.

In another aspect of the invention, there is provided a reward system for a pet, including:
a dispenser device adapted to release food to a pet, the dispenser device moveable between an open position and a closed position, including
a main body having one or more receiving chambers housing food for the pet, and
a food release mechanism configured to release the food in the one or more receiving chambers in the open position and withhold access to the food in the one or more receiving chambers in the closed position, and
wherein the dispenser device is arranged to communicate with and receive instructions from a controller device to move the dispenser device between the open position and the closed position.

The reward system of the invention may advantageously allow the owner to wirelessly control the release of food or treats to their pet as a reward for their behaviour or training.

In a preferred embodiment, the food release mechanism is a turntable mechanism whereby the one or more releasing chambers rotate between the open position and the closed position. Preferably, the food release mechanism includes a turntable, a motor, a gear with magnet, worm gear and a circuit board with sensor.

In another embodiment, the controller is a pet interaction device as described above, including:
one or more actuators for actuation by the pet, the one or more actuators configured to produce a sound or light stimulus for the pet or owner,
a computing apparatus including a processing unit and a memory unit, wherein the processing unit is in communication with the one or more actuators and configured to stimulate or receive the actuating motion of the pet, and
wherein the processing unit is further arranged to process the captured actuating motion and communicate the captured actuating motion to the owner.

For example, the pet interaction device communicates with the dispenser device to move from the closed position to the open position in response to the captured actuating motion.

Preferably, the dispenser device includes one or more speakers and can produce sound stimuli to the pet.

In a further aspect of the invention, there is provided a pet monitoring system for monitoring the heart rate of a pet, the pet monitoring system including
a mobile monitoring device, the mobile monitoring device being removably mountable on the pet, the mobile monitoring device configured to monitor the heart rate of the pet, and a controller device configured to communicate with the mobile monitoring device, and
wherein the mobile monitoring device is configured to transmit heart rate data related to the pet to the controller device.

Most preferably, the mobile monitoring device is a collar or harness.

In an example embodiment, the mobile monitoring device includes one or more sensors that are configured to detect the heart rate of the pet and transmit the sensor signals corresponding to the detected heart rate to the controller device.

In another embodiment, the controller device is a pet interaction device including:
one or more actuators for actuation by the pet, the one or more actuators configured to produce a sound or light stimulus for the pet or owner,
a computing apparatus including a processing unit and a memory unit, wherein the processing unit is in communication with the one or more actuators and configured to stimulate or receive the actuating motion of the pet, and
wherein the processing unit is further arranged to process the captured actuating motion and communicate the captured actuating motion to the owner.

Preferably, mobile monitoring device detects and transmits heart rate data to the pet interaction device in response to the sound or light stimulus and/or in response to the captured actuating motion. This advantageously enables the owner to track the heart rate of the pet in response to various stimuli.

In yet another aspect, there is provided a pet tracking system for tracking a location of a pet, the pet tracking system including:
a mobile tracking device, the mobile tracking device being removably mountable on the pet, the mobile tracking device configured to track the location of the pet, and
a controller device configured to communicate with the mobile tracking device, and
wherein the mobile monitoring device is configured to transmit location data related to the pet to the controller device.

Preferably, the mobile tracking device is a collar or harness.

In an example embodiment, the mobile tracking device includes one or more sensors that are configured to detect location or movement of the pet. For example, the one or more sensors include one or more of an accelerometer, a gyroscope, and a digital compass.

In an embodiment, the controller device is a pet interaction device including:
one or more actuators for actuation by the pet, the one or more actuators configured to produce a sound or light stimulus for the pet or owner,
a computing apparatus including a processing unit and a memory unit, wherein the processing unit is in communication with the one or more actuators and configured to stimulate or receive the actuating motion of the pet, and
wherein the processing unit is further arranged to process the captured actuating motion and communicate the captured actuating motion to the owner.

Preferably, the mobile tracking device detects and transmits location or movement data to the pet interaction device in response to the sound or light stimulus and/or in response to the captured actuating motion. The mobile tracking device is a useful addition to a pet owner and is simple to use and not cumbersome on the pet and allows the pet owner to know the location of their pet to ensure their safety and wellbeing as well as being a useful aid to a training programme.

BRIEF DESCRIPTION OF THE DRAWINGS

Embodiments of the present invention will now be described, by way of example, with reference to the accompanying drawings in which:

FIG. 3A is a perspective front view of a pet interaction device in accordance with an example embodiment.

FIG. 3B is a perspective back view of the pet interaction device in FIG. 3A in accordance with an example embodiment.

FIG. 3C is a front view of the pet interaction device in FIGS. 3A and 3B accordance with an example embodiment.

FIG. 3D is a back view of the pet interaction device in FIGS. 3A, 3B and 3C in accordance with an example embodiment.

FIG. 6A is a perspective view of a pet interaction device connected to a dispensing device (the dispensing device in an open position) in accordance with an example embodiment.

FIG. 6B is a perspective view of a pet interaction device connected to a dispensing device (the dispensing device in a closed position) in accordance with an example embodiment.

FIG. 7A is a schematic drawing of a pet interacting with an interactive system for pets in accordance with an example embodiment.

FIG. 7B is a schematic drawing of a pet interacting with an interactive system for pets in accordance with an example embodiment.

FIG. 7C is a schematic drawing of a pet interacting with an interactive system for pets in accordance with an example embodiment.

DETAILED DESCRIPTION OF THE PREFERRED EMBODIMENT

Figure 1:
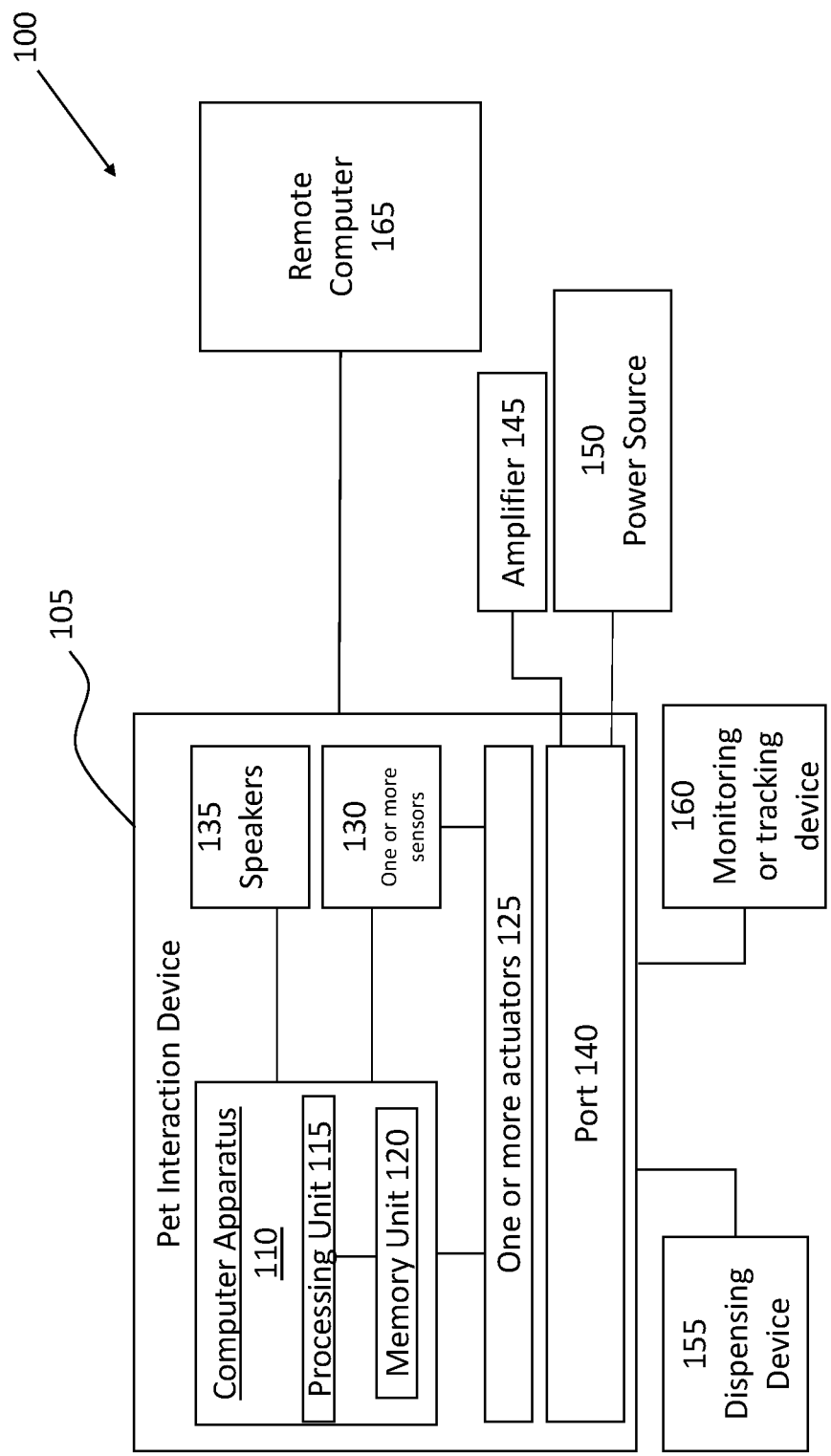
FIG. 1 is a block diagram of an interactive system for pets in accordance with an example embodiment.

With reference to FIG. 1, an embodiment of the present invention is illustrated. This embodiment is arranged to provide an interactive system for pets, comprising:
one or more actuators for actuation by the pet, the one or more actuators configured to produce a stimulus for the pet or owner,
a computing apparatus comprising a processing unit and a memory unit, wherein the processing unit is in communication with the one or more actuators and configured to stimulate or receive the actuating motion of the pet, and wherein the processing unit is further arranged to process the captured actuating motion and communicate the captured actuating motion to the owner.

In this example embodiment, the interactive system is a computer-aided interaction system that includes a pet interaction device in wireless communication with a remote computer or computer system. The interactive system is arranged to boost pet engagement and allow pet owners to take an active role in engaging their pet whilst monitoring their progress. Owners may also use a remote computer, such as a tablet computer, smartphone, desktop computer or other wearable devices to input stimuli of their choice, such as pre-recorded commands, music, or light to engage their pet. The interactive system may be tailored to suit the needs of pets or the owner's training programme for their pet and the modularity of the pet interaction device means one or more peripheral devices may also be connected to the pet interaction device, such as a dispensing device to establish a reward system, or a monitoring, gaming or tracking device to monitor a pet's heart rate or movements for interaction, training or gamification applications. The interactive system of the invention thus provides the owner with an all-rounded solution for pet engagement, care, entertainment and pet monitoring.

Turning firstly to FIG. 1, there is shown a block diagram of an interactive system 100 for pets in accordance with an example embodiment of the invention. In this embodiment, the system 100 includes a pet interaction device 105 arranged to capture an actuating motion 715 of a pet 200. This may include, for example, depressing or touching or otherwise interacting with an actuator (with or without physical touching) such as a button, touch pad, touch screen or any mechanical or electrical device, sensor or switch. The pet 200 can include domestic animals such as dogs or cats or any other animals, although research would suggest that dogs may be extra receptive to actuation and sounds and thus the interactive system 100 may be more suitable for dogs.

In this embodiment, the pet interaction device 105 may include one or more actuators 125 for actuation by the pet 200, and a computing apparatus 110. The one or more actuators 125 are arranged to be actuated and in turn is configured to produce a stimulus 700,710 for the pet 200 or owner. The computing apparatus 110 includes a processing unit 115 and a memory unit 120 and the processing unit 115 is in communication with the one or more actuators 125 and arranged to stimulate or receive the actuating signal, such as an interaction or motion 715 of the pet 200. The processing unit 115 is further arranged to process the actuating motion 715 and communicate the actuating motion 715 to the owner.

The processing unit 115 controls the transfer of data from the pet interaction device 105 to the one or more actuators 125, one or more sensors 130, and other peripheral devices 400 via software programming. The processing unit 115 includes a single microchip, a circuit board system, a card, a mechanism of a motherboard, a computer, and a wide variety of other hardware that can control peripheral devices, such as a graphics card, game controller, network interface card, flash memory controller, and the like.

The processing unit 115 may also include an interaction algorithm and programmed stimulus to interact with the pet 200. The interaction algorithm is selected from a group including different programmed stimuli or sounds, modifying behaviour, and recording the pet's 200 response. The algorithm includes instructions for presenting the stimulus 700,710 to the pet 200. The stimulus 700,710 includes sounds that are pre-recorded, such as pre-recorded voice commands or words spoken by the owner, or musical tones, that are stored in the memory unit 120 and accessible by the processing unit 115. The processing unit 115 is also arranged to process the captured actuating motion 715 by the pet 200 relayed by the one or more sensors 130 which is communicated to the owner via the remote computer 165 through Wi-Fi or Bluetooth. The one or more sensors 130 are electrically connected to the processing unit 115 and configured to detect the actuating motion 715 and transmit sensor signals corresponding to the actuating motion 715 to the processing unit 115.

The owner can present a different stimulus 700,710 to the pet 200 using the remote computer 165 whereby the processing unit 115 receives a modified interaction algorithm and modified programmed stimulus to replace the initial interaction algorithm and initial programmed stimulus. The modified interaction algorithm and modified programmed stimulus changes the stimulus presented to the pet 200, including the timing and/or duration of reinforcement of the stimulus 700,710. The owner can change the stimulus 700, 710 by choice or in response to the captured actuation motion 715 of the pet 200 through a remote computer 165. The remote computer 165 has a display configured to wirelessly communicate with the pet interaction device 105 and/or one or more peripheral devices 400 connected to the pet interaction device 105. The owner may download an interaction program, application or algorithm on the remote computer 165 from a central server and the interaction algorithm may be updated through an application. The interaction algorithm is selected from a group consisting of different programmed stimuli, modifying behaviour, and recording the pet's response. The remote computer 165 receives data related to the pet 200 from the pet interaction device 105 and/or one or more peripheral devices 400 in a suitable communication format for presenting on the display to the owner. The data may also be recorded continuously or intermittently and data from the continuous or intermittent recordings are segregated and inform the modification of the initial or modified programmed stimulus algorithm. The remote computer 165, for example, may be an application or portal accessible on a computer, smartphone, or tablet.

The owner may select stimuli 700,710 for the device 105 via a remote computer 165 and access a stimuli library from a central server. The remote computer 165 can also store data received from the device 105 or from one or more peripheral devices 400 on the central server.

Figure 2:
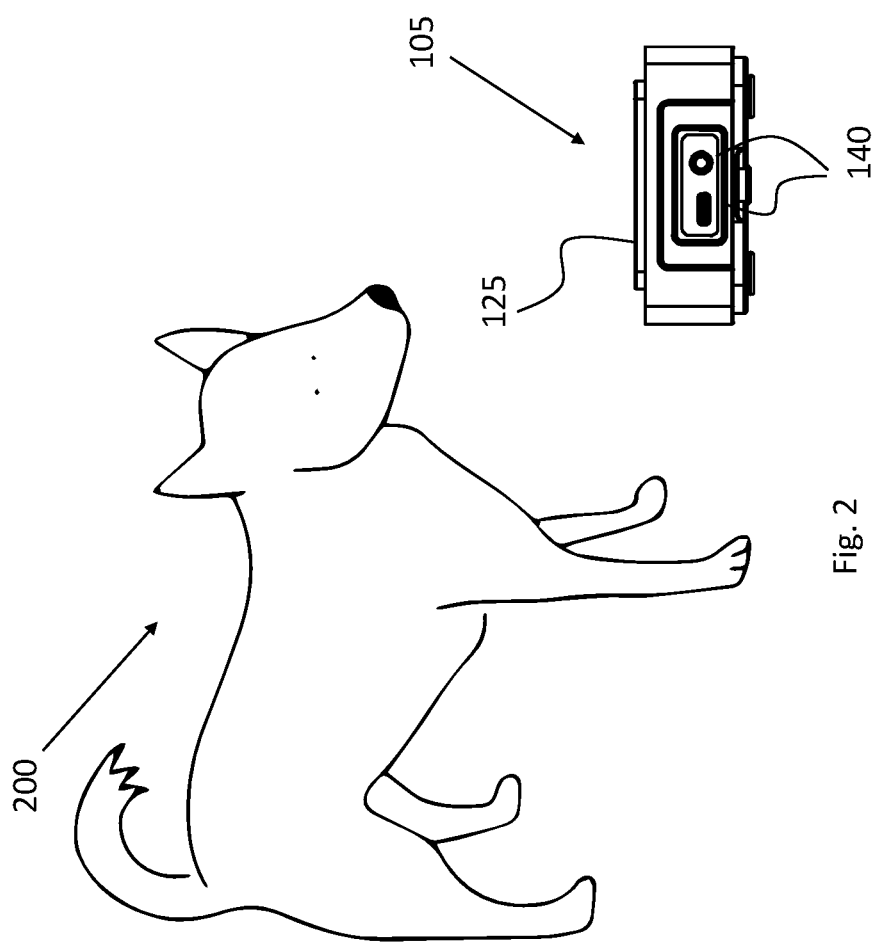
FIG. 2 is a perspective view of a pet interaction device in an interactive system for pets in accordance with an example embodiment.

FIG. 2 is a schematic drawing of a pet 200 and a pet interaction device 105 in accordance with an example embodiment. FIGS. 3A-3D illustrate different views of the device 105 including actuators 125 for engagement by the pet 200. In this example, the interaction device 105 has an elongate body 127 and the actuators 125 are buttons 125 on the elongated body 127. The buttons 125 are palm-sized and adapted to receive a paw of the pet 200 allowing for ease of use by pets that do not have the dexterity of human fingers. FIGS. 3A-3D illustrate that the pet interaction device 105 is a keyboard and the actuators 125 are keys or buttons on the keyboard. The actuators 125 are actuated when the pet 200 or its owner depresses, i.e., the actuating motion 715, the keys 125 or buttons 125 on the keyboard 105.

A user, who is likely to be an owner or human operator of the device 105 may firstly place the device 105 on a surface such that it may be accessible by a pet 200. The human operator may then proceed to switch on the device by actuating a switch 141 to turn on the device 105. Optionally, the device 105 may also proceed to connect with the user's remote computer 165 so as to facilitate the operation of any functions or data through applications or software on the remote computer 165 or other cloud-based services. The device 105 may also proceed to communicate with other one or more peripheral devices 400 if available. Once the device 105 is in an operational state, a pet 200 may then proceed to interact with the device.

In this example, when upon the pet 200 actuates the keyboard 105 in response to a stimulus 700, 710. The stimulus 700,710 may be sound, light or a combination of both sound and light. The visual stimulus 710 includes different coloured lights, flashing, blinking, or dimming light. Preferably, the one or more actuators 125 include one or more LED elements, i.e., is an illuminated button, to produce the visual stimulus 710. The pet interaction device 105 also includes a speaker 135 to present the audio stimulus 700 to the pet 200. In this process, the sounds may represent a specific key or note of a musical keyboard, and thus allowing the pet 200 to play a short musical tune or appreciate the different tones of sounds. Alternatively, the sounds may be selected to represent other animal sounds (dog's bark, cat's meow, bird's call) or human commands or words, and thus allowing the pet 200 to actuate certain actuators 125 to express a certain sound with the keyboard 105. This in turn may provide a method of communication between the pet 200 and other pets, or its owners or other humans.

Figure 4:
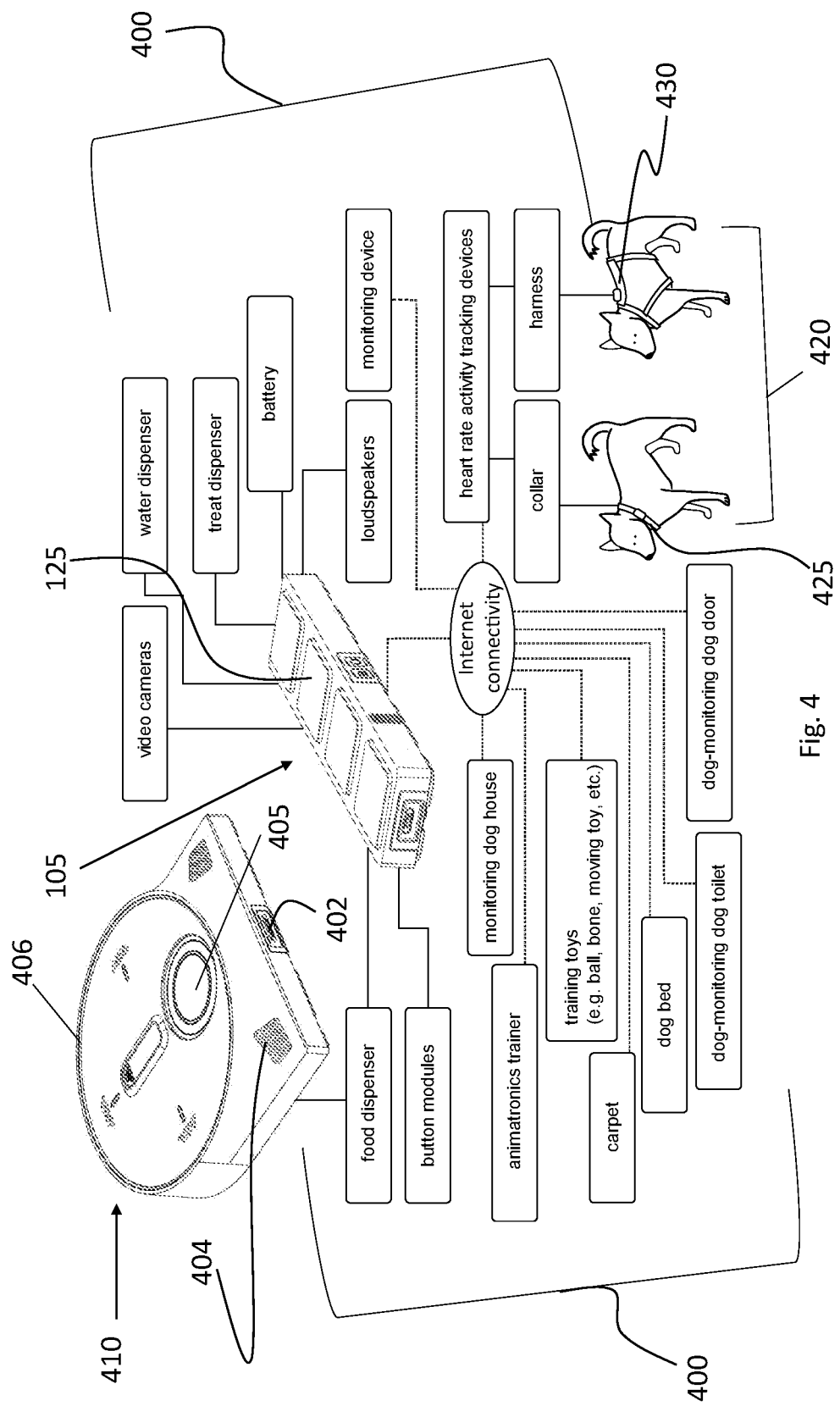
FIG. 4 is a diagram illustrating the modular capability of the pet interaction device to connect with one or more peripheral devices in accordance with an example embodiment.
Figure 5:
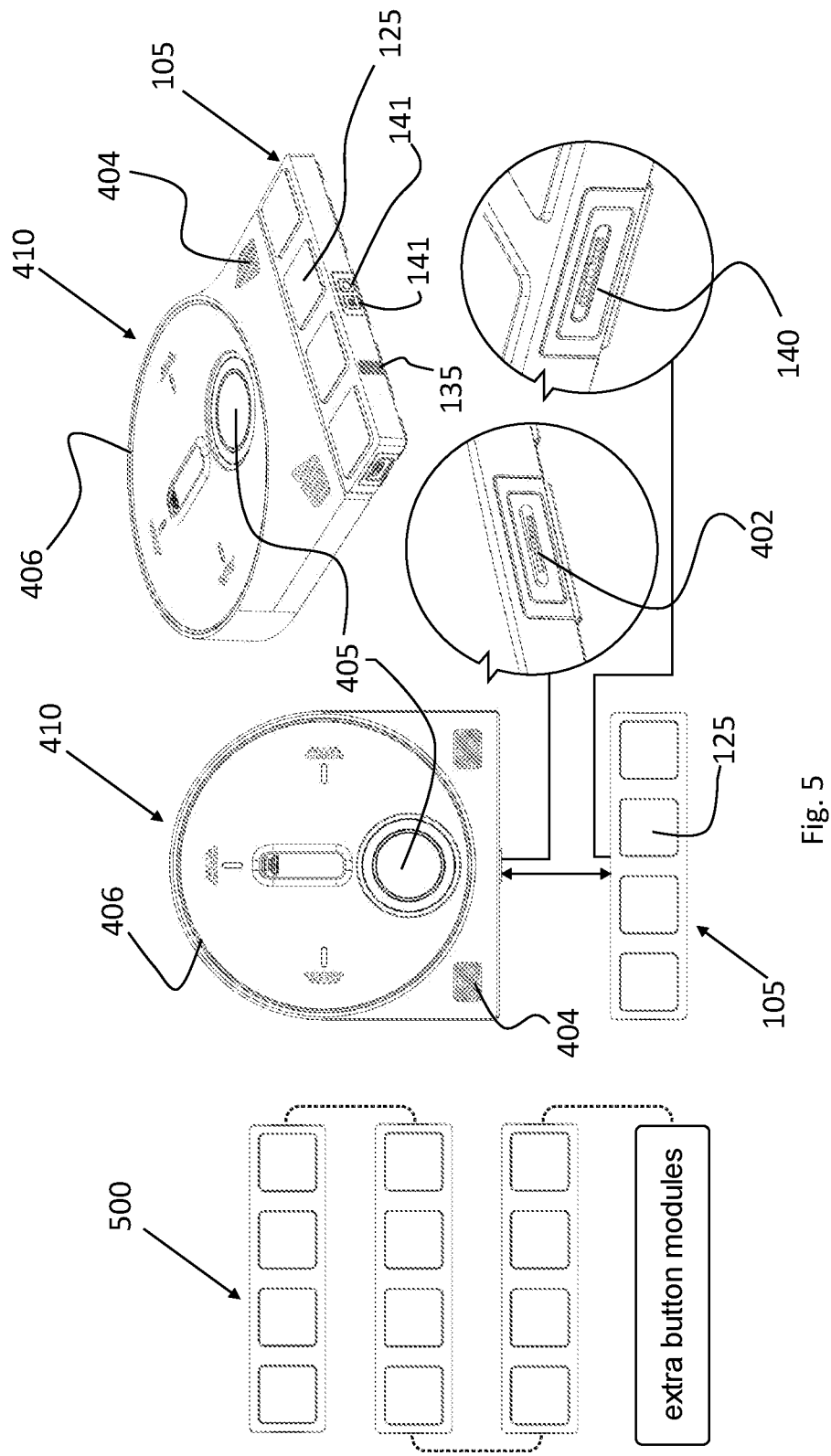
FIG. 5 is a diagram illustrating the modular capability of the pet interaction device to connect with button modules and a dispensing device in accordance with an example embodiment.

One of the many advantages of the interactive system for pets 100 is its modular capabilities. The interaction device 105 is modular and able to connect to one or more peripheral devices 400. These connections may be wireless or through various connection ports 140 on the device 105, including a USB Type C port, a 3.5 mm speaker port, and a pogo connector port. FIG. 4 and FIG. 5 illustrate the modular capability of the per interaction device 105 and its ability to connect with one or more peripheral devices 400, including one or more of a dispensing device 155 such as a food dispenser, water dispenser or treat dispenser, a monitoring or tracking device 160 such as a location tracking device or a fitness tracking device, button module(s) 500, speakers 135, video cameras, power source 150, amplifier 145, training toy, animatronics trainer, battery, pet door, pet bed, pet-monitoring pet house, pet toilet or carpet. By including this modular capability, new devices may be designed and added to the interactive system overtime to provide new functions for the care, entertainment or interaction with the pet. Preferably, with each new devices that are connected, the keyboard's 105 computing and communication arrangements allow for all of these new devices to operate and communicate with the remote computer or external computing device 165 as used by the owner.

FIG. 4 illustrates that the interaction device 105 can connect to a monitoring or tracking device 420 configured to monitor a location or heart rate of the pet 200. This advantageously allows the pet owner to monitor the pet's heart rate and movement in relation to the stimulus 700, 710 to assess their engagement and interaction with the device 105, whilst also using these parameters to track their pet's 200 overall health, wellbeing, and safety.

Preferably, the monitoring or tracking device 420 is a collar 425 or harness 430 that may be removably mountable on the pet 200 and includes one or more sensors that detect location, movement and/or heart rate of the pet 200. The one or more sensors include one or more of an accelerometer, a gyroscope, proximity sensor (to detect other tracking devices in proximity), GPS, or a digital compass.

The interaction device 105 is adapted to communicate with the monitoring or tracking device 420 and the monitoring or tracking device 420 transmits location, movement, breathing rates or heart rate data to the interaction device 105. The owner can access the data relating to their pet 200 via the remote computer 165. This may in turn provide additional functionalities to track the location or feelings of the pet by monitoring for the pet's heart rates and movements.

It may also us its proximity sensor or GPS sensors to determine a location of the pet and thus tracking if the pet is in, or visits, specific locations or interact with other animals that also uses a similar monitoring or tracking device 420. This may be advantageous as the information may provide owners to track their pet's location, stress levels, and their interaction with other animals or humans.

In some example embodiments, the pet 200 may also be using the monitoring or tracking device 420 whilst interacting with the keyboard 105. In these examples, the pet's owner may be able to observe and track the pet's emotional state whilst the pet 200 interacts with the keyboard 105. In certain observed examples, pets 200, particularly dogs, may react to specific sounds such as a wolves' howl, specific pitches of violin, bass or guitar sounds, or other natural sounds or music. These reactions may result in hyper activity, calming effect or the triggering of howling or playful behaviour. Such reactions may be detected via the monitoring or tracking device 420 which could detect the change in the pet's heart rates or breathing rates, as well as their movements.

FIG. 5 shows the pet interaction device 105 connected to a dispensing device 410 via a male-female port connection, i.e., the dispensing device port 402 connecting to the device port 140.

Figure 6C:
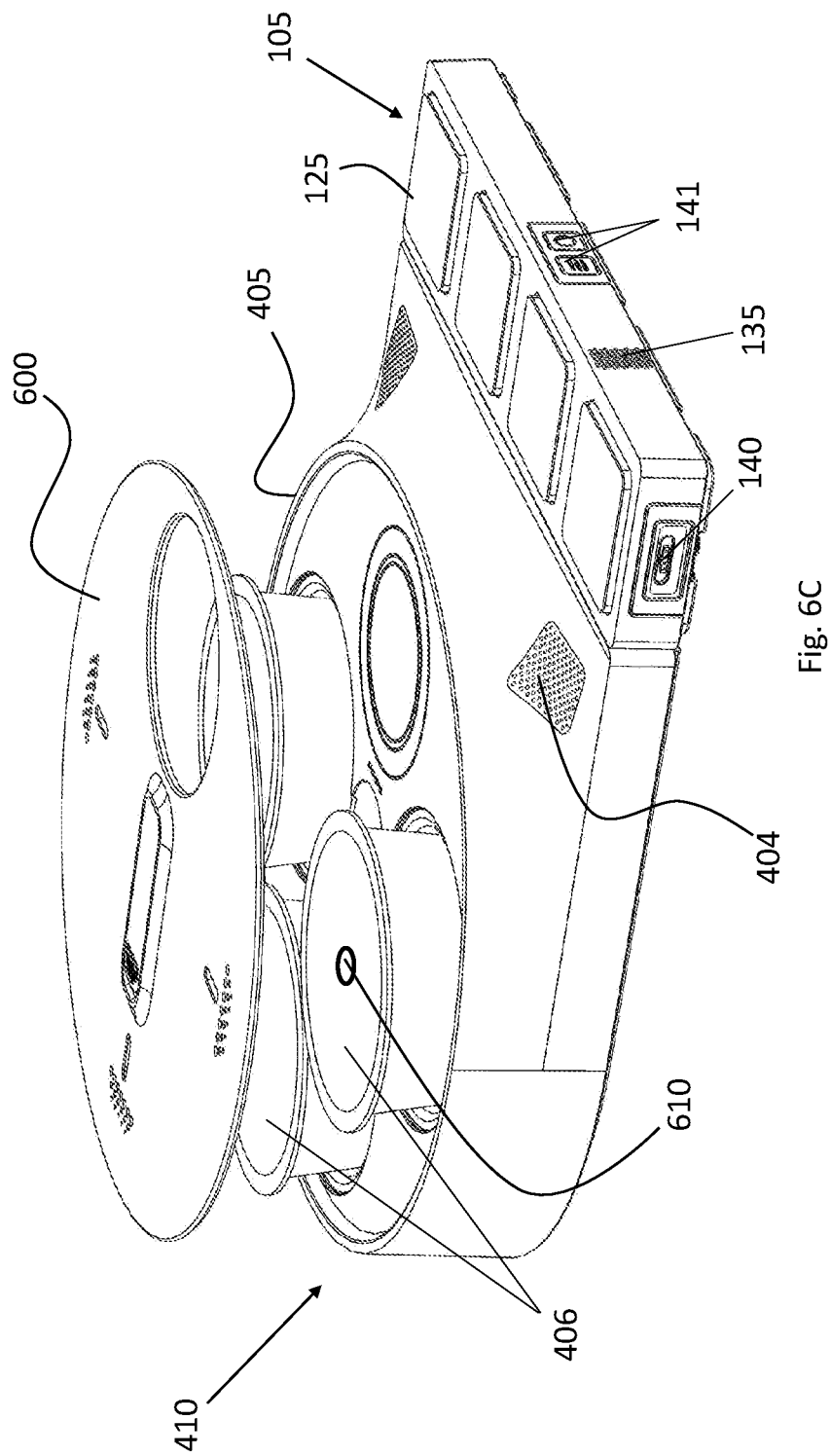
FIG. 6C is a perspective view of the pet interaction device connected to the dispensing device in FIGS. 6A and 6B with a cross-sectional view of the dispensing device illustrating internal components in accordance with an example embodiment.

FIGS. 6A-6C show the dispensing device 410 connected to the pet interaction device 105 in accordance with an example embodiment. The dispensing device 410 is moveable between an open position (FIG. 6A) and a closed position (FIG. 6B) and is adapted to release food 610 to the pet 200 in the open position. The food 610 may include, for example, fresh food, kibbles or treats. The dispensing device 410 includes a main body 406 having one or more dispensing device speakers 404. The main body 406 has three receiving chambers 405 housing food 610 for the pet 200. In an example embodiment, the three receiving chambers are three stainless steel bowls that are removable for cleaning.

Figure 6D:
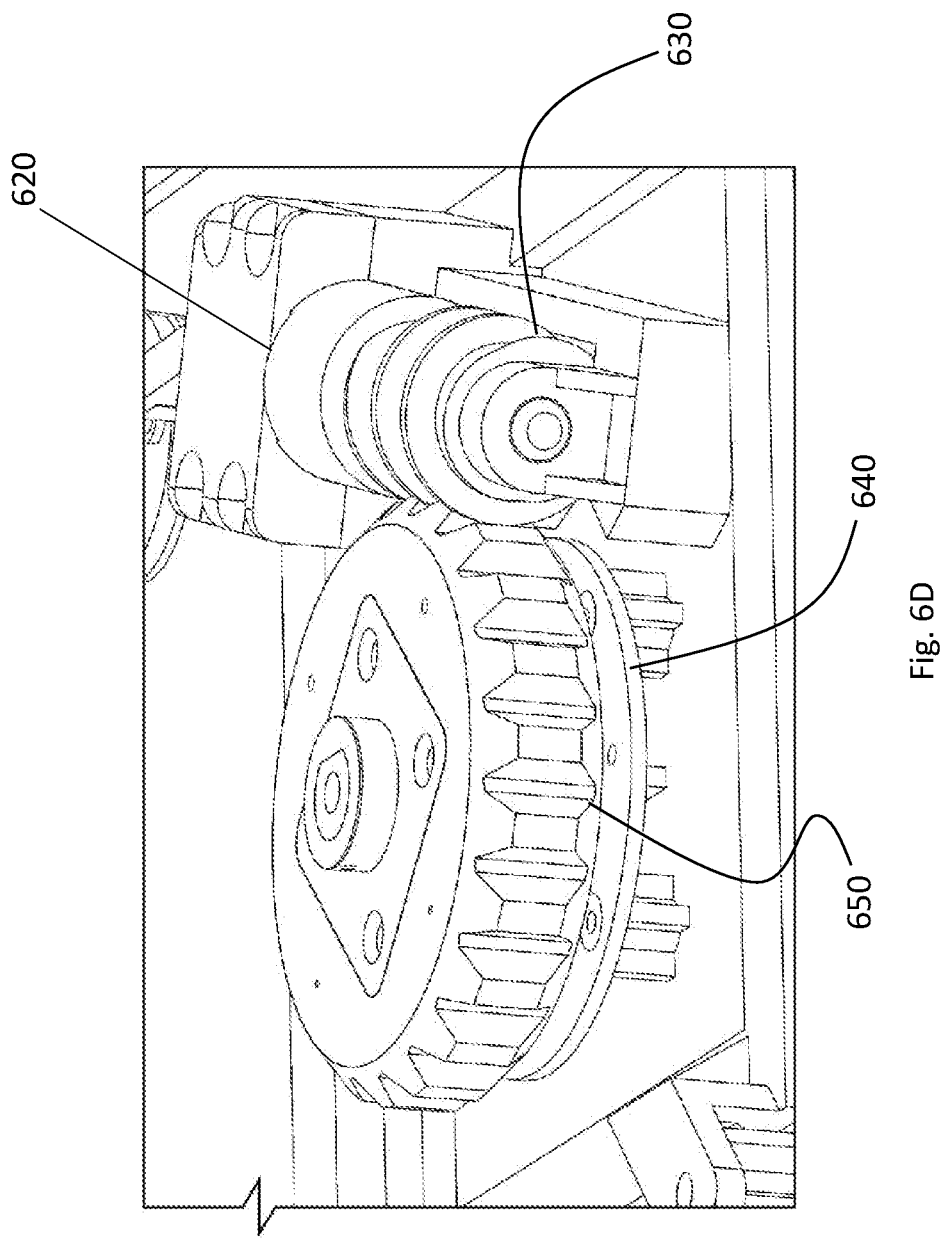
FIG. 6D is a schematic drawing of components of the food release mechanism in a dispensing device in accordance with an example embodiment.

The dispensing device also includes a food release mechanism shown in FIG. 6D to release the food 610 stored in the receiving chambers 405 in the open position (FIG. 6A) and withhold access to the food 610 stored in the receiving chambers 405 in the closed position (FIG. 6B).

FIG. 6D illustrates the components of the food release mechanism including a turntable 600, a motor 620, a gear with magnet 650, worm gear 630 and a circuit board with sensor 640. The rotation of the food access turntable 600 is controlled by a sensor 640 embedded in the worm gear mechanism 630.

The dispensing device 410 is arranged to communicate with and receive instructions from the pet interaction device 105 to move the dispensing device 410 between the open position and the closed position. FIG. 7A shows the pet 200 receiving the stimulus 700,710 via the interaction device 105 and the dispensing device 410 in the closed position. This is followed by the pet 200 actuating the button 125 in response to the stimulus 700, 710 and the dispensing device 410 moving to the open position in response to the captured actuating motion 715 illustrated in FIG. 7B. FIG. 7C shows the pet 200 eating the food 610 from the dispensing device 410.

The interactive system for pets 100 of the present invention provides an effective and easy-to-use system that allows owners to prioritise pet engagement, interaction, and training with minimal effort. The computer-aided interaction system allows owners to create customisable and unlimited training, behavioural, entertainment, monitoring, and interaction programmes for their pets 200 from the comfort of their homes. The ability of the interactive system 100 to be connected to the internet means the owner can share data relating to their pet 200 with fellow pet owners and friends and provides the opportunity for pets 200 to interact electronically with other pets. The system 100 software can also be easily updated by the owner to incorporate new teachings or resources and the owner can interact with and explore alternative training programs and discuss their pet's progress and make revisions to their programmes.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An interactive system for pets comprising:
a pet interaction device arranged to engage and capture an actuating motion of a pet,
the pet interaction device comprising an elongated body having:
one or more actuators located on the elongated body for actuation by the pet, the
one or more actuators configured to produce a stimulus for the pet or owner, a male-female port on the elongated body for removably connecting to a dispensing device port on a dispensing device that is adapted to respond to actuation of the one or more actuators from the pet interaction device to move the dispensing device between an open position and a closed position; and
a computing apparatus in the elongated body comprising a processing unit and a memory unit, wherein the processing unit is in communication with the one or more actuators and configured to stimulate or receive an actuating motion of the pet,
wherein the processing unit is further arranged to process the captured actuating motion and communicate the motion to the owner, and to allow the operation and communication with the dispensing device and a remote computer or external computing device.

2. The interactive system according to claim 1, wherein the pet interaction device is modular and configured to connect to one or more peripheral devices.

3. The interactive system according to claim 2, wherein the one or more peripheral devices is a monitoring or tracking device configured to monitor a location or heart rate of the pet.

4. The interactive system according to claim 3, wherein the tracking device is a collar or harness adapted to be removably mountable on the pet.

5. The interactive system according to claim 2, wherein the one or more peripheral devices are selected from the group consisting of: food dispenser, water dispenser, location tracking device, fitness tracking device, button module(s), speakers, video cameras, power source, amplifier, training toy, animatronics trainer, battery, pet door, pet bed, pet-monitoring pet house, pet toilet or carpet.

6. The interactive system according to claim 5, wherein the remote computer is configured to enable the owner to select the stimulus for the pet.

7. The interactive system according to claim 2, wherein the dispensing device is arranged to release food via a turntable release mechanism, the turntable release mechanism comprising a rotatable turntable, motor, worm gear, gear with magnet and a circuit board with sensor, wherein rotation turntable is controlled by a sensor embedded in the worm gear.

8. The interactive system according to claim 1, wherein the stimulus includes sounds.

9. The interactive system according to claim 8, wherein the sounds are pre-recorded or music.

10. The interactive system according to claim 1, wherein the stimulus includes light.

11. The interactive system according to claim 10, wherein the light includes different coloured lights, flashing, blinking or dimming light.

12. The interactive system according to claim 1, wherein the one or more actuators are palm-sized buttons adapted to receive a paw of the pet.

13. The interactive system according to claim 1, wherein the pet interaction device further includes one or more sensors electrically connected to the processing unit, the one or more sensors configured to detect the actuating motion and transmit sensor signals corresponding to the actuating motion to the processing unit.

14. The interactive system according to claim 1, wherein the interaction device further includes one or more connection ports for connecting to one or more peripheral devices.

15. The interactive system according to claim 1, wherein the interaction device is a keyboard and the one or more actuators are keys on the keyboard.

16. The interactive system according to claim 1, wherein the stimulus is a combination of sounds and lights.

17. The interactive system according to claim 1, wherein the pet is a cat or a dog.

18. The interactive system according to claim 1, wherein the processing unit is adapted to receive a modified interaction algorithm and modified programmed stimulus to replace the initial interaction algorithm and initial programmed stimulus.

* * * * *